(12) United States Patent
Schumacher et al.

(10) Patent No.: US 11,999,438 B2
(45) Date of Patent: Jun. 4, 2024

(54) RETAINING SYSTEM FOR AN ENERGY STORE AND A TWO-WHEELED VEHICLE COMPRISING THIS RETAINING SYSTEM

(71) Applicant: Robert Bosch GmbH, Stuttgart (DE)

(72) Inventors: Christoph Schumacher, Dusslingen (DE); Dennis Mehlo, Reutlingen (DE); Haris Alisic, Reutlingen (DE); Thilo Koeder, Gerlingen (DE); Volker Jabs, Dusslingen (DE); Lisa Bayer, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 838 days.

(21) Appl. No.: 15/734,474

(22) PCT Filed: Jul. 11, 2019

(86) PCT No.: PCT/EP2019/068696
§ 371 (c)(1),
(2) Date: Dec. 2, 2020

(87) PCT Pub. No.: WO2020/020653
PCT Pub. Date: Jan. 30, 2020

(65) Prior Publication Data
US 2021/0213820 A1    Jul. 15, 2021

(30) Foreign Application Priority Data
Jul. 27, 2018   (DE) .......................... 102018212574.0

(51) Int. Cl.
*B60K 1/04*      (2019.01)
*B62H 5/00*      (2006.01)
(Continued)

(52) U.S. Cl.
CPC ................. *B62M 6/90* (2013.01); *B60K 1/04* (2013.01); *B62H 5/001* (2013.01); *B62J 43/20* (2020.02);
(Continued)

(58) Field of Classification Search
CPC . B62M 6/90; B62M 6/80; B62M 6/00; B60K 1/00; B60K 1/04; B62H 5/001;
(Continued)

(56) References Cited

U.S. PATENT DOCUMENTS

| 4,035,921 A | 7/1977 | Williams |
| 6,016,882 A | 1/2000 | Ishikawa |

(Continued)

FOREIGN PATENT DOCUMENTS

| CA | 3030973 A1 | 2/2018 |
| CN | 1247142 A | 3/2000 |

(Continued)

OTHER PUBLICATIONS

International Search Report for PCT/EP2019/068696, Issued Nov. 5, 2019.

*Primary Examiner* — James M Dolak
(74) *Attorney, Agent, or Firm* — NORTON ROSE FULBRIGHT US LLP; Gerard A. Messina (57) ABSTRACT

A retaining system which may be used for locking an energy store, in particular for an electrically operable two-wheeled vehicle. The retaining system is designed such that it does not transfer any forces from the energy store to the retaining system in the locked or latched position.

6 Claims, 7 Drawing Sheets

(51) Int. Cl.
*B62J 43/20* (2020.01)
*B62M 6/90* (2010.01)
*H01M 50/202* (2021.01)
*H01M 50/24* (2021.01)
*H01M 50/262* (2021.01)

(52) U.S. Cl.
CPC ......... *H01M 50/202* (2021.01); *H01M 50/24* (2021.01); *H01M 50/262* (2021.01)

(58) Field of Classification Search
CPC ... B62H 5/00; B62J 43/00; B62J 43/20; B62J 43/13; B62J 43/30; B62J 43/16; B60Y 2200/13; B60Y 2200/132; B60Y 2200/134; B60Y 2200/12; B60Y 2200/126; B60L 53/80; B60L 50/64; B60L 50/66; B60L 50/60; B60R 16/04; H01M 50/202; H01M 50/24; H01M 50/262; H01M 50/264; H01M 50/289; H01M 50/244; H01M 50/249; H01M 50/20; H01M 50/271; H01M 2220/20
See application file for complete search history.

(56) References Cited

U.S. PATENT DOCUMENTS

| | | | | |
|---|---|---|---|---|
| 6,285,160 | B1 * | 9/2001 | Tsai | B62M 6/90 |
| | | | | 429/96 |
| 6,415,881 | B1 * | 7/2002 | Tsai | B62K 3/002 |
| | | | | 180/68.5 |
| 6,631,835 | B2 | 10/2003 | Fang | |
| 7,393,125 | B1 * | 7/2008 | Lai | B62M 6/80 |
| | | | | 280/281.1 |
| 8,636,092 | B2 * | 1/2014 | Kawatani | B62J 43/20 |
| | | | | 180/68.5 |
| 8,881,857 | B2 * | 11/2014 | Binggeli | B62M 6/90 |
| | | | | 180/68.5 |
| 9,093,701 | B2 * | 7/2015 | Kawatani | H01M 50/249 |
| 9,399,499 | B2 * | 7/2016 | Honda | B62M 6/90 |
| 9,969,455 | B2 * | 5/2018 | Kwag | B62J 43/28 |
| 10,183,591 | B2 * | 1/2019 | Shieh | B62K 19/40 |
| 10,351,013 | B2 * | 7/2019 | Shieh | B62M 6/40 |
| 11,024,917 | B2 * | 6/2021 | Trif | B62M 6/90 |
| 11,535,331 | B2 * | 12/2022 | Lee | B62M 6/90 |
| 11,884,147 | B2 * | 1/2024 | Bengtsson | B60K 1/04 |
| 11,912,141 | B2 * | 2/2024 | Okubo | B62J 43/20 |
| 2013/0216883 | A1 | 8/2013 | Kawatani et al. | |

FOREIGN PATENT DOCUMENTS

| | | |
|---|---|---|
| CN | 1295641 A | 5/2001 |
| CN | 2772036 Y | 4/2006 |
| CN | 2918847 Y | 7/2007 |
| CN | 101051680 A | 10/2007 |
| CN | 203038994 U | 7/2013 |
| CN | 103291150 A | 9/2013 |
| CN | 204096021 U | 1/2015 |
| CN | 105392948 A | 3/2016 |
| CN | 105460105 A | 4/2016 |
| CN | 106137530 A | 11/2016 |
| CN | 106427514 A | 2/2017 |
| CN | 107026251 A | 8/2017 |
| CN | 206903400 U | 1/2018 |
| CN | 206942366 U | 1/2018 |
| CN | 107700970 A | 2/2018 |
| DE | 69734265 T2 | 5/2006 |
| DE | 202015103750 U1 | 10/2016 |
| DE | 102016213903 B3 | 1/2018 |
| EP | 2280436 A2 | 2/2011 |
| EP | 2626233 A2 | 8/2013 |
| EP | 2871126 A1 | 5/2015 |
| GB | 622179 A | 4/1949 |
| JP | 2013163399 A | 8/2013 |
| JP | 2013208935 A | 10/2013 |
| JP | 2013208945 A | 10/2013 |
| WO | 2017009637 A1 | 1/2017 |

* cited by examiner

RETAINING SYSTEM FOR AN ENERGY STORE AND A TWO-WHEELED VEHICLE COMPRISING THIS RETAINING SYSTEM

FIELD

The present invention relates to a retaining system for an energy store and to a two-wheeled vehicle comprising a frame which includes such a retaining system.

BACKGROUND INFORMATION

To accommodate batteries and accumulators in the frame of two-wheeled vehicles, in particular electric bicycles, there are conventional retaining systems which facilitate mechanical attachment as well as electronic contacting. Normally, in this case both functions (locking and contacting) occur at different places in the retaining system so as to avoid damage to the sensitive contacts.

German Patent Application No. DE 10 2016 213 903 A1, for example, describes a two-part retaining system in which a moving bolt is provided on the lock side of the retaining system, the bolt engaging into a corresponding recess of the energy store or of a retaining device attached to the energy store.

German Patent Application No. DE 697 34 265 T2 describes a cup for accommodating a battery container, the cup being attached to the frame of a bicycle. Here, to lock the battery container in place, a locking hook comprising a spring is described, the locking hook being first pushed back by the battery container being inserted into the cup and then engaging in an engagement notch of the battery container.

PCT Application No. WO 2017/009637 A1 describes a further locking mechanism of a battery in a housing on a bicycle frame. This mechanism enables a rotating element which is connected to a lock to block a lever element in the fixture, thereby preventing the movement of a locking bolt.

European Patent Application EP 2 280 436 A2 describes a locking mechanism of a battery pack in which a locking plate which is rotatably fastened to a spring engages into a locking pin.

SUMMARY

An example embodiment of the present invention may achieve an objective of providing a retaining system which may be used to lock an energy store, in particular for an electrically operable two-wheeled vehicle. In accordance with an example embodiment of the present invention, the retaining system is designed such that it does not transfer any forces from the energy store to the retaining system in the locked or latched position.

In accordance with an example embodiment of the present invention, the retaining system comprises a lock which has a moving lock pin. This lock pin engages into the opening of a likewise movable locking latch such that by actuating the lock, and thereby the lock pin, the locking latch may be moved from the latched position to an unlatched position and vice versa. To this end, the lock pin is moved mechanically along the inside of the opening, for example through rotation by the lock. The core of the present invention is that the locking latch in the opening is designed such that an inward-directed first molding is provided which in combination with the lock pin limits the mobility of the locking latch at least in the latched position.

This example embodiment prevents the locking latch from being brought to an unlatched position, in other words to a position in which the energy store may be removed, in particular without actuating the lock.

The molding may be designed in the form of a support, for example. Here, the lock pin may be provided as a stop for the first molding in the latched position. For this purpose, it may be provided that the stop, that is, the mechanical contact between the molding or support and the lock pin, is reached only once a (small) distance is traveled. This makes it possible to achieve a small amount of play, such that vibrations are not directly transferred from the first molding to the pin. This distance, which must be traveled due to the physical distance between the first molding/support and the lock pin, also makes it possible to prevent any forces from being exerted onto the lock pin and the lock connected thereto while the installed energy store is being used. This force coupling prevents damage to the lock due to vibrations.

The lock is designed to move the lock pin within the opening of the locking latch. This movement may be a rotating movement which rotates the lock pin out of the area to another part of the opening in which the pin may serve as a stop for the first molding.

Furthermore, the locking latch may be mounted rotatably. To this end, a base point or point of rotation may be provided at which the locking latch is rotatably mounted. On the other hand, in the upper part the locking latch may be equipped with the opening and a lug which may be rotatably screwed into a corresponding receptacle of the energy store or of a support plate on the energy store. The locking latch may be rotated about the point of rotation in the lower area by actuating the lock or the lock pin.

In a further development of the present invention, a second molding may be provided in the external area of the locking latch facing the energy store. This second molding may form a lug which locks the energy store in the latched position. Furthermore, this second molding may be designed such that the second molding moves the locking latch to the side, for example rotationally, when the energy store is inserted, in order to open up the path for the energy store into the retaining system.

Further advantages derive from the description below of exemplary embodiments and the figures.

DETAILED DESCRIPTION OF EXAMPLE EMBODIMENTS

Figure 1:
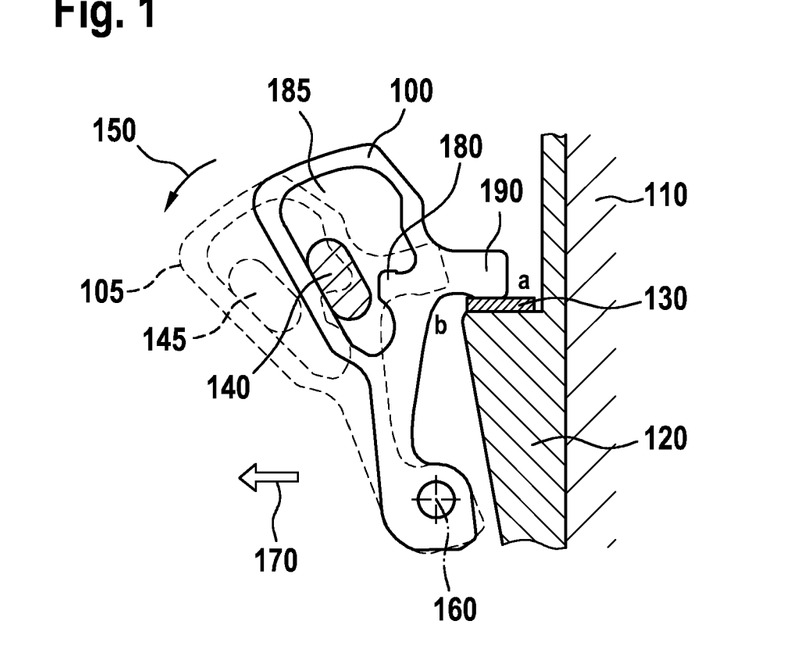
FIG. 1 shows the various positions of the locking latch or retaining system according to an example embodiment of the present invention.

FIG. 1 show the locking mechanism of the retaining system according to an example embodiment of the present invention. A locking latch 100 is provided which has an opening 185. A first molding 180 in the form of a support element is formed in this opening 185, the molding being situated in the latched position across from a lock pin 140. Furthermore, a second molding 190 is provided which is directed outward from locking latch 100 and away from opening 185. This second molding 190, for example a lug, engages into a corresponding bracket 130 of the energy store 110 and mechanically locks it accordingly. For this purpose, bracket 130 may be part of energy store 110 or of a support device or support plate 120 attached to the energy store 110. As can be seen in FIG. 1, locking latch 100 is mounted on a base point 160 rotatably in the direction of rotation 150. This rotating bearing allows locking latch 100 to be brought from the latched position to an unlatched position 105 (shown by dashed lines in FIG. 1 and shown again in FIG. 5) and vice versa. In the process of latching or locking, second molding 190 presses against bracket 130, resulting in a mechanical immobilization.

Figure 5:
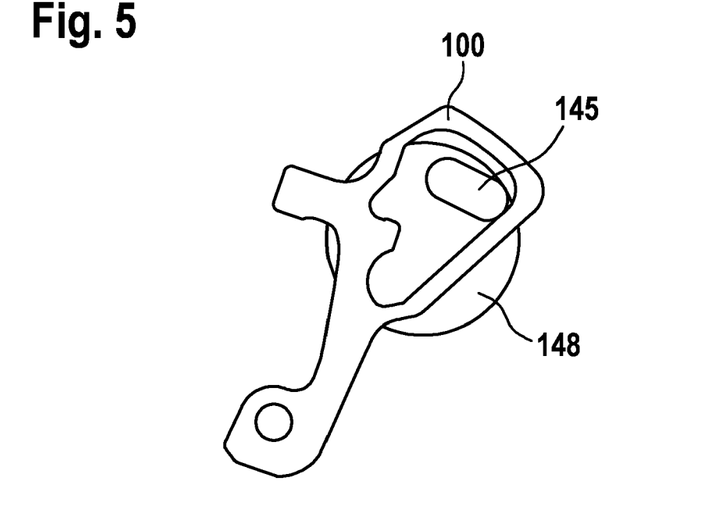
FIG. 5 shows the locking latch and the lock pin in the unlatched position, in accordance with an example embodiment of the present invention.

The motion of locking latch 100 is produced by a lock 148 by way of which the position of lock pin 140 may be changed (for clarification, see also FIG. 5 which shows lock pin 145 in the unlatched position 105). Actuating lock 148 allows lock pin 140 to move in opening 185 and thus to rotate locking latch 100 from one position to the other.

In the latched position, first molding 180 and lock pin 140 are at a distance from one another such that there is no direct mechanical contact between the two elements. This spacing makes it possible prevent vibrations of energy store 110, for example when retained on or in a bicycle frame while the bicycle is being ridden, from being transferred to lock pin 140 and thereby to lock 148 during use, and thus from putting a load on lock pin 140 and lock 148. This embodiment according to the present invention is thereby able to prevent a force from being coupled in in the longitudinal direction 170 and acting on lock 148.

Figure 2A:
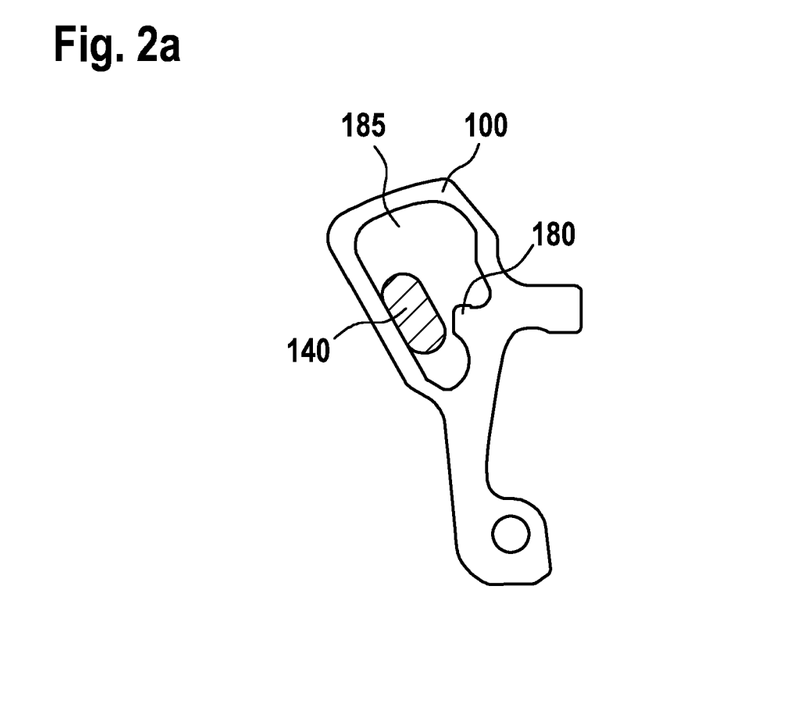
FIGS. 2a to 2c show various positions of the lock pin relative to the first molding, in accordance with an example embodiment of the present invention.
Figure 2B:
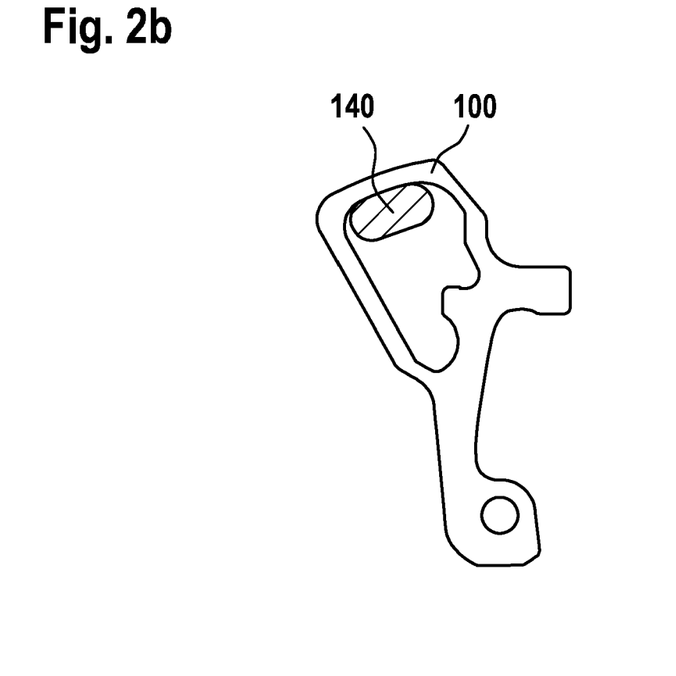
Figure 2C:
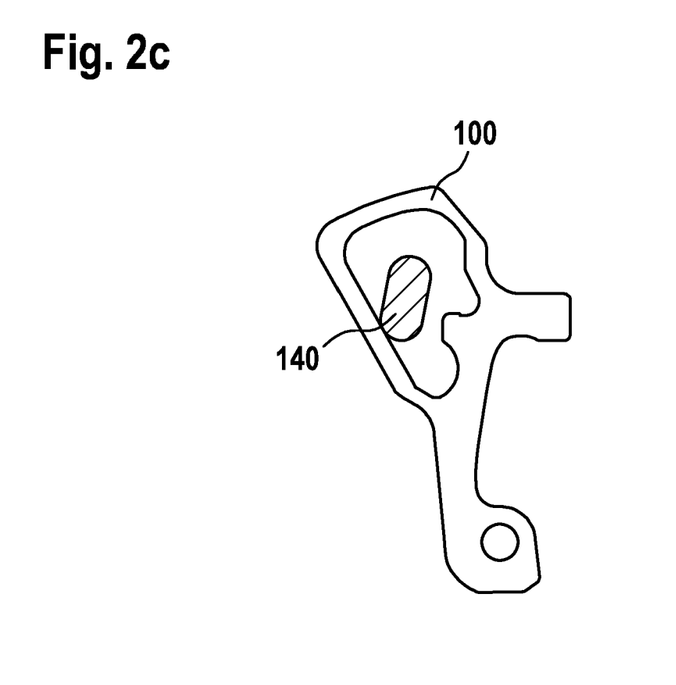
Figure 3A:
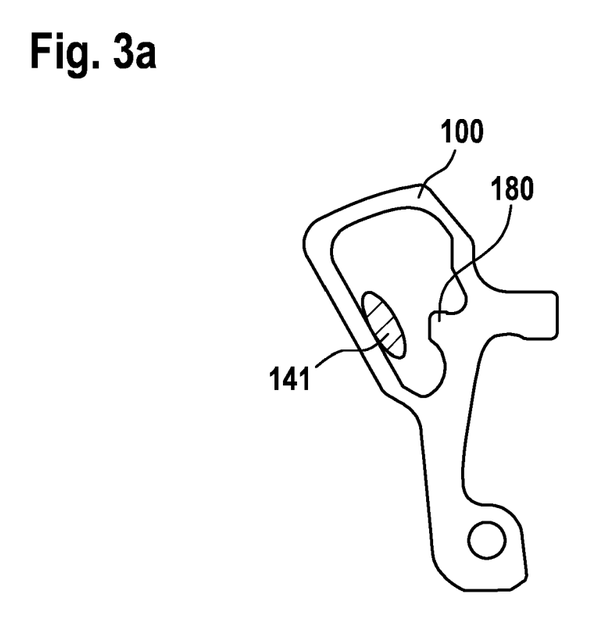
FIGS. 3a to 3f depict various embodiments of the lock pin geometry, in accordance with an example embodiment of the present invention.
Figure 3B:
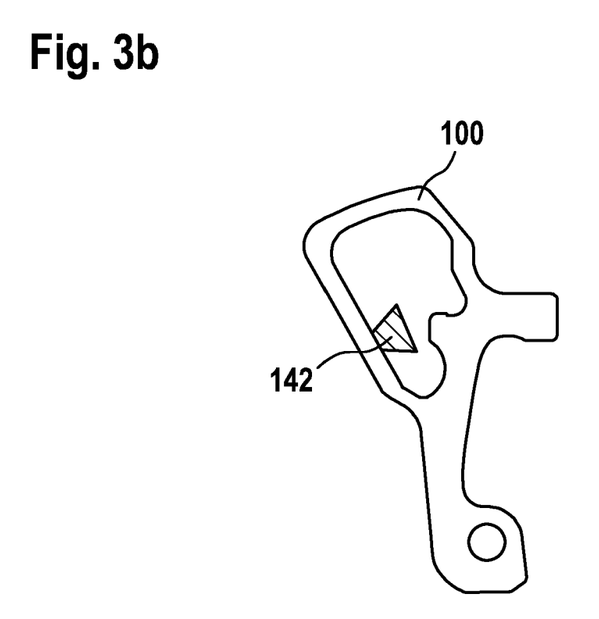
Figure 3C:
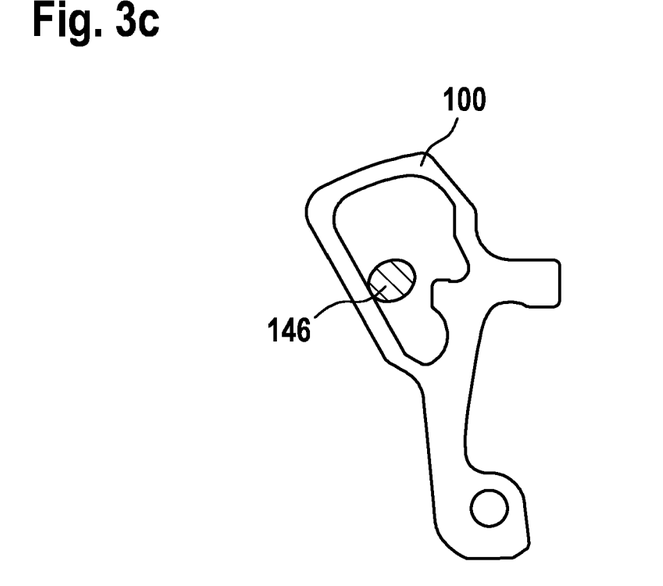
Figure 3D:
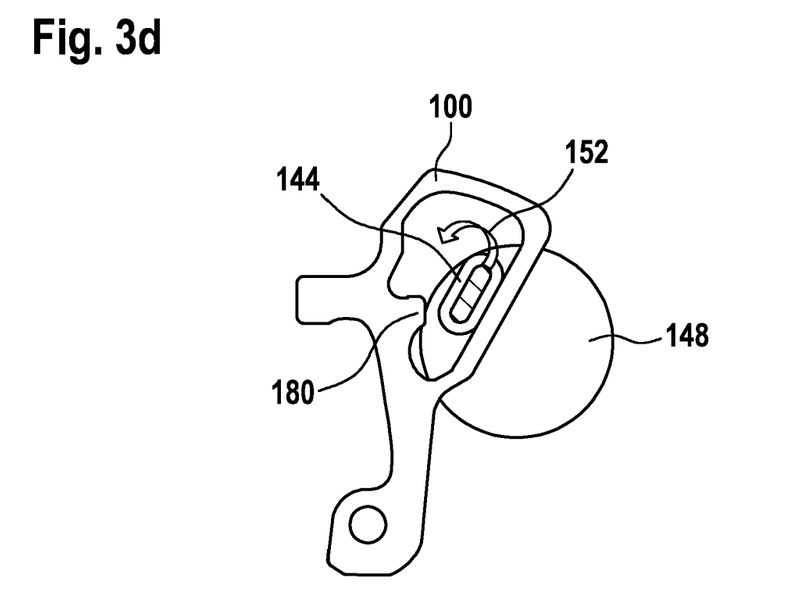
Figure 3E:
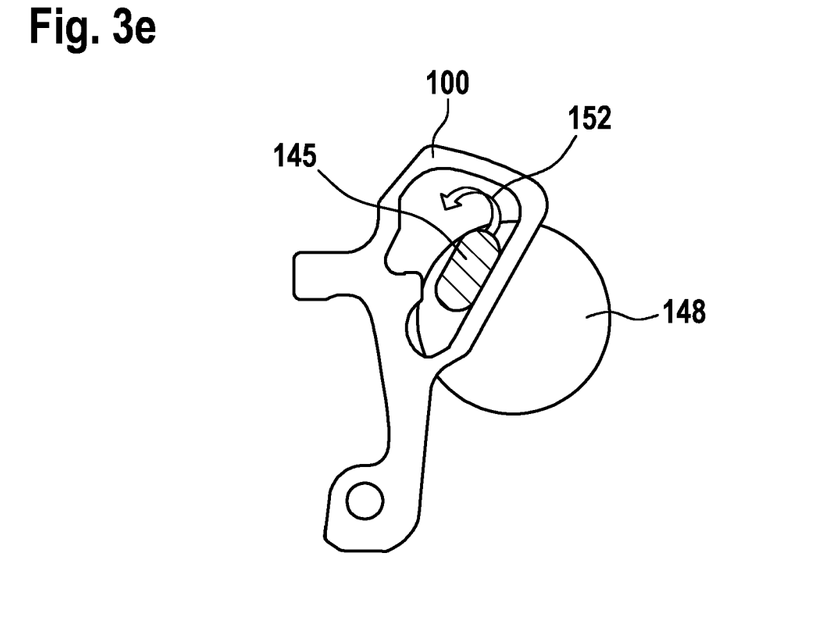
Figure 3F:
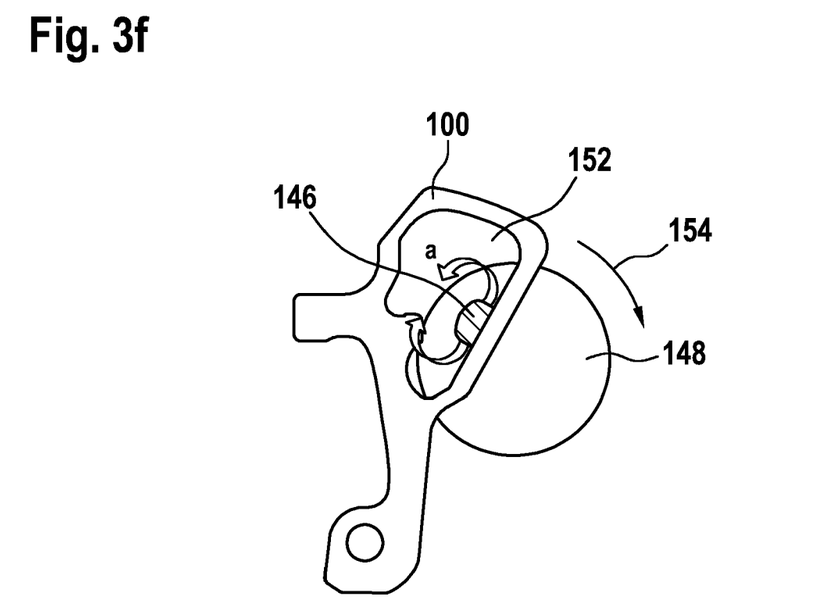
Figure 4A:
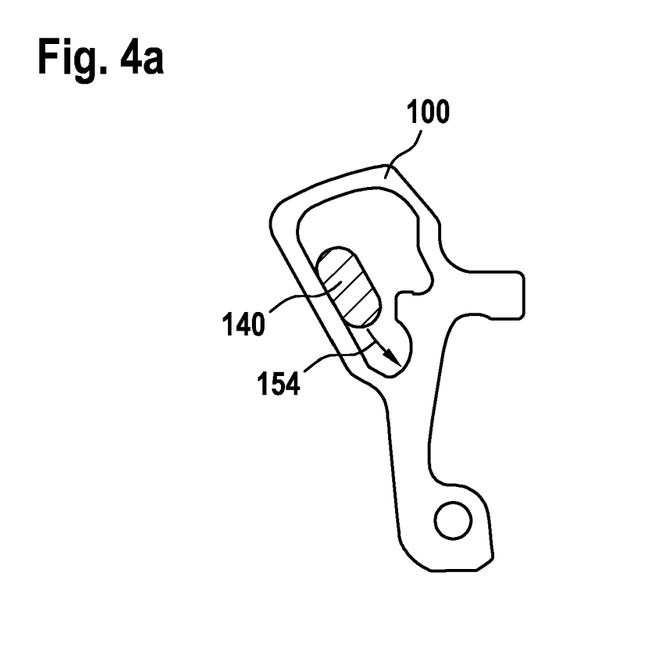
FIGS. 4a and 4b show different directions of rotation of the lock pin, in accordance with an example embodiment of the present invention.
Figure 4B:
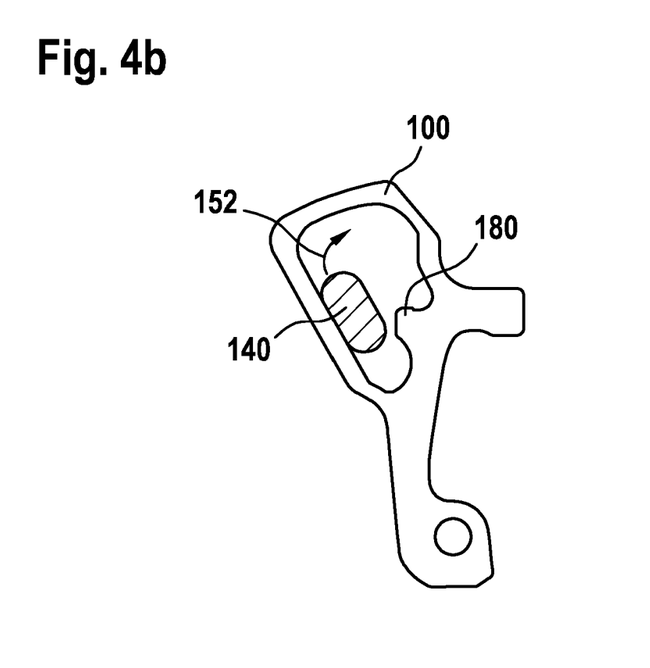

FIGS. 2a to 2c show various positions of lock pin 140 within opening 185 of locking latch 100. FIGS. 3a to 3f show examples of various embodiments of lock pin 141 to 146. Also shown in FIGS. 3d to 3f and FIGS. 4a and 4b are various (rotational) motions of lock pin 140 within opening 185. In this case, lock pin 140 may be rotated upward (in direction 152) or downward (in direction 154) out of the area of the part of opening 185 in which the pin may be used as a stop for first molding 180.

Figure 6:
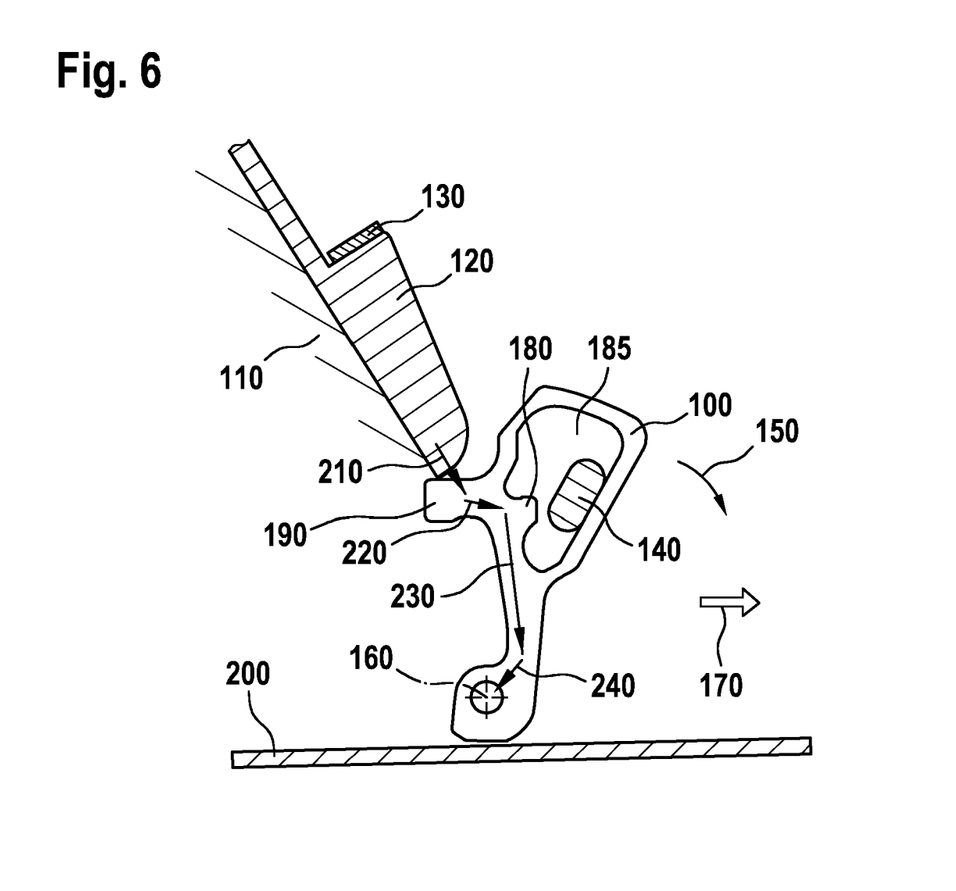
FIG. 6 shows in exemplary fashion the insertion of the energy store and the function of the second molding of the locking latch, in accordance with an example embodiment of the present invention.

FIG. 6 shows another advantageous embodiment of locking latch 100 and the second molding 190 formed thereon. When energy store 110 is inserted, for example into frame 200 of a two-wheeled vehicle, the present state may be such that locking latch 100 is in the way. A special embodiment of second molding 190 allows the force 210 applied when energy store 110 or a support plate 120 attached to energy store 110 is inserted and set on second molding 190 to be transferred and converted to a rotation about base point 160. In the process, force 210 is transferred within locking latch 100, first along second molding 190 and then along force lines 220, 230, and 240. Since in this case lock pin 140 lies outside the area of opening 185 in which it may serve as a stop for first molding 180 inside of opening 185, locking latch 100 may rotate accordingly in rotational direction 150.

What is claimed is:

1. A retaining system for retaining an energy store, comprising:
    a lock with a lock pin; and
    a locking latch which is movably mounted, and has an opening into which the lock pin engages, the lock pin configured to move the locking latch when the lock is actuated, the locking latch configured to mechanically lock the energy store in the retaining system in a latched position, and to release the lock of the energy store in an unlatched position;
    wherein the locking latch has a first molding corresponding to a protuberance that projects into the opening, a position of the lock pin and an arrangement of the first molding in the opening in the latched position being provided in such a way that a first mobility of the locking latch is less than a second mobility of the locking latch in the unlatched position.

2. The retaining system as recited in claim 1, wherein the lock pin corresponds to a stop for the first molding in the latched position, the stop being reached after a distance is traveled by the lock pin.

3. The retaining system as recited in claim 1, wherein the lock pin is moved within the opening to achieve the unlatched position of the locking latch, and wherein the lock pin does not correspond to a stop for the first molding in the unlatched position.

4. The retaining system as recited in claim 1, wherein the locking latch is rotatably mounted, movement of the lock pin in the opening effecting the rotation of the locking latch.

5. The retaining system as recited in claim 1, wherein the locking latch includes a second molding oriented away from the opening and in the latched position engages into a receptacle for locking the energy store by way of a rotating movement.

6. The retaining system as recited in claim 5, wherein the second molding is configured such that a support plate attached to the energy store moves the locking latch to the unlatched position when inserted.

* * * * *